United States Patent

[11] 3,593,328

[72] Inventor William C. Trethewey
Newark, Ohio

[21] Appl. No. 867,961
[22] Filed Oct. 20, 1969
[45] Patented July 13, 1971
[73] Assignee Owens-Corning Fibreglas Corporation
Continuation of application Ser. No. 589,410, Oct. 25, 1966, now abandoned.

[54] MULTICOMPONENT PLATED GLASS FIBER MAGNETIC MEMORY
6 Claims, 15 Drawing Figs.

[52] U.S. Cl. .......... 340/174 PW, 340/174 NA, 340/174 TF, 340/174 M, 340/174 LM
[51] Int. Cl. .......... G11c 5/02, G11c 11/04, G11c 11/14
[50] Field of Search .......... 340/174, 174 PW, 174 MA; 346/174

[56] References Cited

UNITED STATES PATENTS 3,432,825 3/1969 Maeda .......... 340/174

*Primary Examiner*—James W. Moffitt
*Assistant Examiner*—Steven B. Pokotilow
*Attorneys*—Staelin & Overman and Myron E. Click

ABSTRACT: Magnetic memory units utilizing multicomponent glass fibers having continuous glass and electrically conductive and/or magnetic components in the fibers, for arrangement in a memory unit array. Novel multicomponent glass fibers and strands are also disclosed.

INVENTOR.
WILLIAM C. TRETHEWEY
BY Staelin & Overman
ATTORNEYS

INVENTOR
WILLIAM C. TRETHEWEY
BY
Staelin + Overman
ATTORNEYS

MULTICOMPONENT PLATED GLASS FIBER MAGNETIC MEMORY

This application is a continuation of application Ser. No. 589,410, filed Oct. 25, 1966, now abandoned.

This invention relates to electrical memory apparatus in general and particularly to electrical memory devices or storage apparatus constructed from flexible fiber components. The flexible fiber components are advantageously multiple component fibers. In most embodiments, one of the components of the fibers is a nonconductive or insulating material. Other components of the fibers may include electrically conductive components, magnetic components, ferromagnetic ceramic components, or combinations of the above with other components to obtain the desired results.

The increasing use of computers has intensified efforts to improve the components for a range of applications from industrial uses to aerospace. The heart of any computer is the memory or storage unit which may retain for later use the instructions for the problem being solved, may store numbers that will be needed, may keep a record of the intermediate results of computation, etc. It is obvious that the capacity of the memory or storage unit controls to a large extent the usefulness of the computer. Magnetic storage units have been the most popular because of their dependability, storage capacity per unit volume, and durability. Most computers use binary arithmetic to solve problems, which is based on a numbering system that uses only two digits: zero and one. A single spot on magnetic tape, a magnetic drum, or a single one of any array of magnetic cores has been utilized to record this information. The predetermined spot on the magnetic tape or drum or the predetermined magnetic core is magnetized in one direction to indicate that a zero is stored, and the other direction to indicate that a one is stored. Suitable combinations of these zeros and ones can be used to represent any number, letter, or other symbol that the computer must use. Because magnetic tape and magnetic memory drums have a comparatively long response time when the capacity is high, the most widely used type of memory is the magnetic core memory. Very small separate magnetic rings or cores store individual bits of information, with each core being capable of being magnetized in either of two directions, for indicating the zero and one of the binary system. Although magnetic core memories are suitable for many applications, they are comparatively expensive since the small magnetic rings must be assembled in an array with a plurality of wires being threaded through each core to store information and sense or readout information stored. Although durable under most circumstances, such magnetic core memories may be susceptible to damages under high impact or high gravitational forces. Further, even though the magnetic core memories occupy only a comparatively small amount of space, it is desirable to provide a memory with the same or larger capacity which would occupy even less space and afford more capacity per unit of weight. Although research in cryogenic cybernetics may afford some answers in this area, difficulties arise in reaching and maintaining the ultralow temperatures desired.

It is a further object of this invention to provide an improved electrical memory or storage apparatus.

It is a further object of this invention to provide an improved electrical memory apparatus which affords high mechanical strength and durability, dependability, adaptability for microminiaturization, and adaptability for any desired geometrical configuration.

It is a still further object of this invention to provide an improved memory apparatus from flexible ceramic fibers, such fibers being multiple component fibers for single or multiple purpose use in said memory unit.

It is another object of this invention to provide improved flexible electrical component fibers suitable for use in memory units or other electrical apparatus.

In attaining the above objects, the invention features a memory unit comprising a first electrically conductive flexible fiber and a second electrically conductive flexible fiber arranged to be disposed adjacent to each other at only one intersection. The conductive portions of the fibers are electrically insulated from each other and magnetizable means are disposed in magnetizable relationship with the intersection of the fibers. At least one of the fibers may be a multiple component fiber having an electrically conductive interior core or component and an insulating exterior component. The insulating exterior component is advantageously ceramic to provide high tensile strength and good insulation. Each fiber in the memory unit may be a multiple component fiber with a continuous interior core component and a continuous exterior component covering the interior component. One of the components is electrically conductive and the other of the components is electrically insulating to provide the insulation between the electrically conductive portions of the fibers. As stated above, the insulating component is preferably ceramic to provide a high tensile strength and a high degree of insulation. One of the multiple component fibers may further include the magnetizable means as a component thereof. Alternatively, the magnetizable means may comprise a separate flexible fiber arranged to have a portion adjacent the intersection of the electrically conductive fibers. The magnetic flexible fiber may be a multiple component fiber having a ferromagnetic ceramic composition, having an interior core of magnetizable material with an exterior skin or covering of insulating or supporting characteristics, or having an interior core supporting an exterior covering of magnetic material which preferably is nonconductive.

A memory unit featuring the teachings of this invention may further comprise a first plurality of electrically conductive flexible fibers and a second plurality of electrically conductive flexible fibers, the fibers being arranged in an array so that a fiber of the first plurality is disposed adjacent a fiber of the second plurality at only one intersection. Means are provided for insulating the electrically conductive portions of the fibers from each other and magnetizable means are disposed in magnetizable relationship with each of the intersections. The fibers may be multiple component fibers, each having an electrically conductive interior component and further including the insulating means as an exterior component covering the interior conductive component. Each of the fibers of the first or second pluralities or of both of the pluralities of multiple component fibers may include magnetizable means as a component thereof. Preferably Preferably the fibers include a ceramic component for the high tensile strength capabilities and the insulating qualities thereof. The array of first and second plurality of fibers may initially be arranged in a planar array and the magnetizable means may comprise magnetic material disposed in a plane adjacent to and substantially parallel with the planar array of fibers. The magnetic material may be supported by a substantially planar surface of flexible material allowing the entire memory unit to be formed to a desired geometrical configuration. The first and second plurality of fibers may be interwoven to provide an integral structure. The fibers, whether interwoven or arranged in successive planar dispositions to provide the intersections required, may be held together or bound to the magnetizable surface with a binder to provide an integral structure. The magnetizable means may comprise a plurality of flexible fibers arranged to have a portion of a fiber disposed in magnetizable relationship adjacent each intersection of the electrically conductive fibers.

Another embodiment of a memory unit featuring the concepts of this invention may comprise a first plurality of electrically conductive flexible fibers formed into a first strand, a second plurality of electrically conductive flexible fibers formed into a second strand, the first and second strands being arranged to be disposed adjacent to each other at only one intersection. Means are provided for insulating the strands from each other and magnetizable means are disposed in magnetizable relationship with the intersection of the strands. The fibers of each strand may be multiple component fibers having an electrically conductive interior component and further including the insulating means as an exterior component covering the interior conductive component. One or both of the plurality of multiple component fibers making up the strands may further include the magnetizable means as a component thereof.

The strand may have a connector provided for the fibers in a strand by applying molten conductive material to the sheared ends of the fibers. The molten conductive material joins the conductive components electrically and is cooled to provide a solid connector. The insulating component of the multiple component fibers is preferably ceramic since the ceramic component fibers shear cleanly to provide a substantially uniform exposure of the electrically conductive component for adherence to the connector.

The magnetizable means of this unit may comprise a third plurality of flexible fibers. The third plurality of flexible fibers may be joined or intermingled with one or both of the first and second plurality of fibers to form the first or second strand mentioned above. The magnetizable component of the first plurality of multiple component fibers mentioned hereinbefore is preferably substantially nonconductive. The solid connector as described above may be provided for the strands or fibers whether they are multiple component fibers or whether the multiple component fibers further include the magnetizable component.

The invention further features a continuous flexible fiber suitable for use in an electrical apparatus such as the memory unit described herein or in electrical delay lines which comprises an interior core of electrically conductive material and an exterior covering of ferromagnetic ceramic material which is electrically nonconductive. Such a fiber may be provided with a solid connector at the end thereof as disclosed above. The invention further features a strand suitable for use in electrical apparatus which comprises a first plurality of multiple component flexible fibers each having an interior core of electrically conductive material and an exterior covering of ceramic material, and a second plurality of flexible ferromagnetic ceramic fibers joined with said first plurality of fibers to form the strand. The strand may be provided with the solid connector as described hereinbefore.

Other objects, features and advantages will become apparent from the following description when taken in conjunction with the accompanying drawings, in which.

Figures 1, 2, 3, 4, 5, 6, 7:
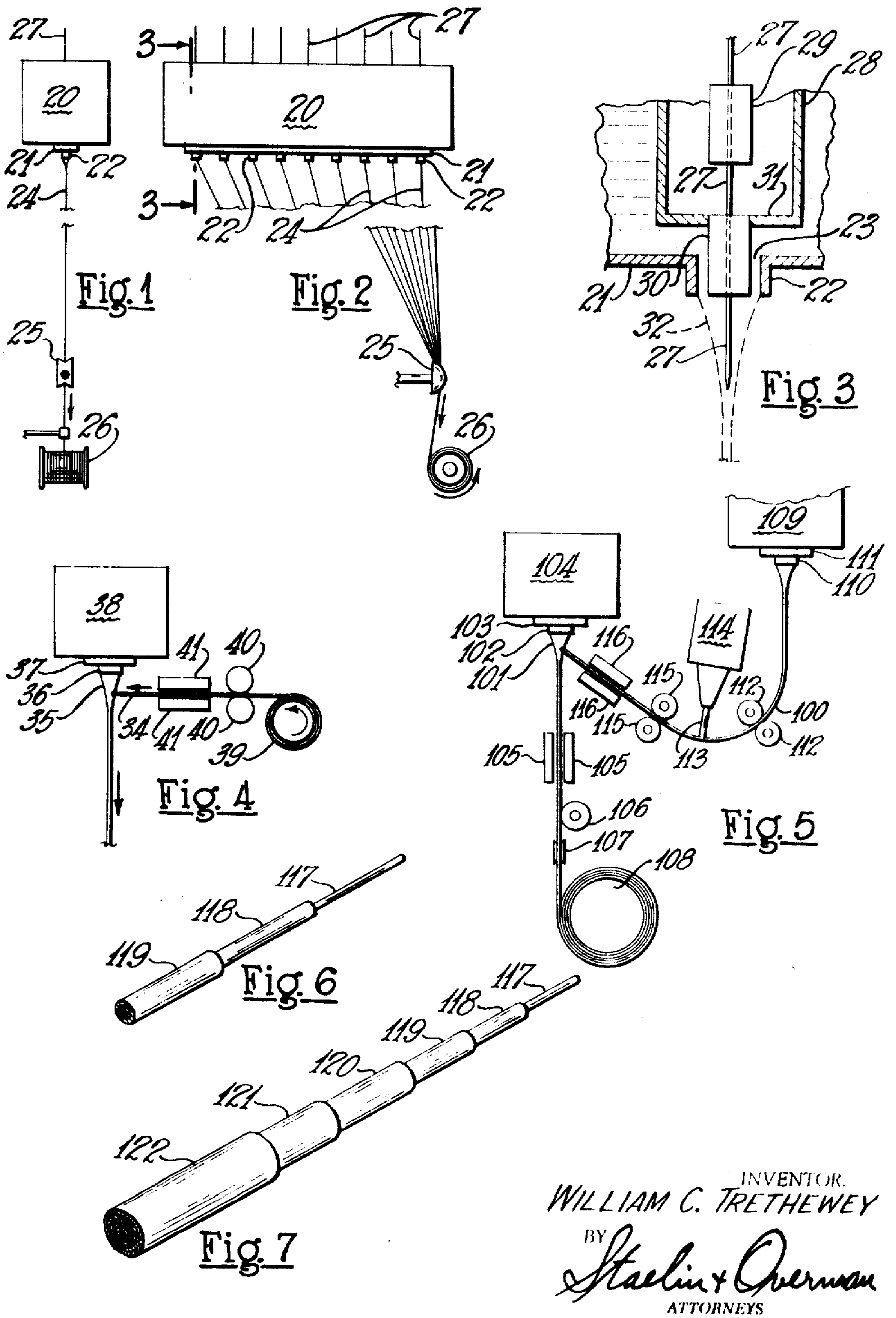
FIG. 1 is a schematic representation in front elevation showing a glass melting tank for use in drawing continuous fibers of glass or other similar vitreous material, and relatively small diameter rods passing through a central portion of the melting tank for interior incorporation in the fibers produced.
FIG. 2 is a view in side elevation of the apparatus of FIG. 1.
FIG. 3 is an enlarged view in vertical section along the line 3–3 of FIG. 2.
FIG. 4 is a schematic view in vertical elevation showing modified apparatus for introducing a relatively small diameter rod of a substance into a fiber of glass or other similar material.
Figure 8:
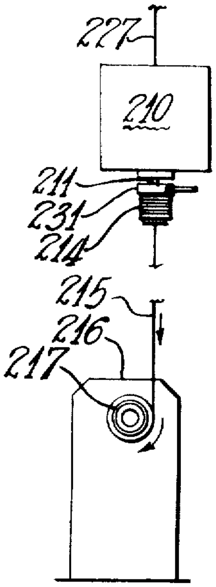
Figure 9:
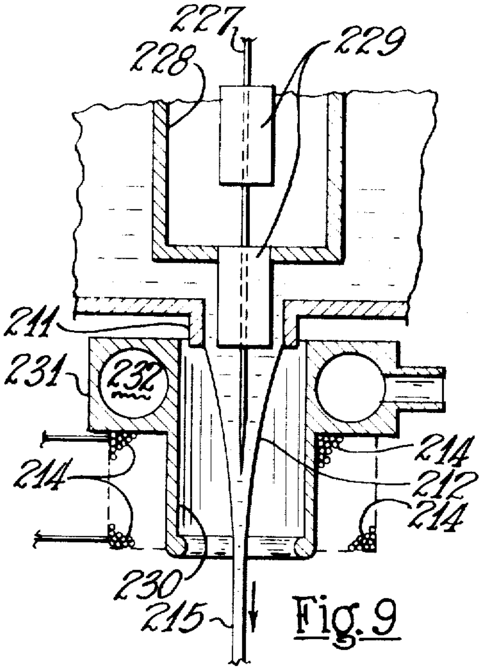
Figure 10:
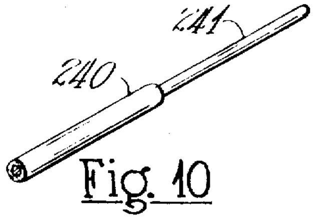
Figure 11:
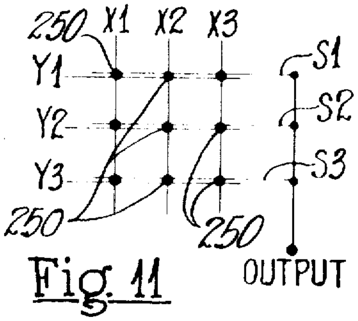
Figure 12:
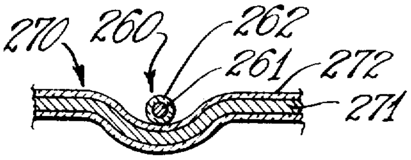
Figure 13:
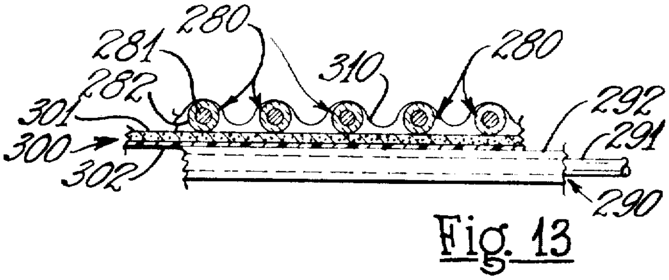
Figure 14:
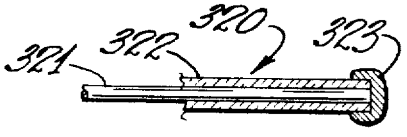
Figure 15:
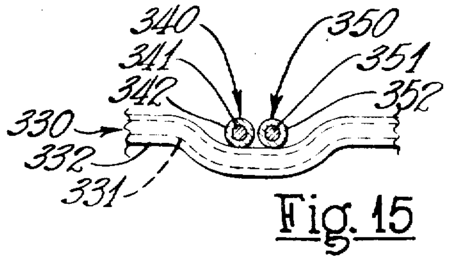

FIG. 5 is a schematic view in vertical elevation showing apparatus similar to that of FIG. 4 for introducing a relatively small diameter rod of a substance into a fiber of glass or other similar material, but wherein the introduced fiber is formed generally concurrently with the modified fiber, is coated with a powdered material, and the modified fiber is, itself, then introduced into the final fiber;

FIG. 6 is a view in perspective, with parts broken away, showing a product which can be produced in the apparatus of FIG. 5;

FIG. 7 is a perspective view, similar to FIG. 6, with parts broken away showing a product that can be produced by modifying the apparatus of FIG. 5;

FIG. 8 is a somewhat schematic general arrangement of apparatus for producing a fiber or filament having an interior electrically conductive core and an exterior covering of ferromagnetic ceramic;

FIG. 9 is an enlarged illustration of the fiber forming zone of the arrangement of FIG. 8;

FIG. 10 is a view in perspective, with a part broken away, showing the product resulting from the apparatus of FIGS. 8 and 9;

FIG. 11 is an illustration of an array of magnetic cores and electrical conductors in use as a magnetic memory storage unit;

FIG. 12 is an enlarged cross-sectional view of an intersection of flexible fibers embodying the teachings of this invention;

FIG. 13 is a cross-sectional view of an array of fibers incorporated in a second embodiment of this invention;

FIG. 14 is a view in section of a fiber provided with a solid electrical connector; and FIG. 15 is a cross-sectional view of a third embodiment of the teachings of this invention.

Although the invention is herein exemplified in specific detail by reference to the production of multiple component glass or ceramic fibers and the use of such fibers in the apparatus, it will be apparent in view of the disclosure that it has application to the production and use of fibers of other materials as well. Therefore, all embodiments are illustrative only and not limiting in any sense with respect to apparatus, process, product or other use of the invention as disclosed herein. Since glass fibers have outstanding characteristics of high tensile strength, high insulating qualities, etc., ceramic or glass fibers are preferably used in the invention and thus the production of specific multiple component fibers comprising glass and one or more other components is illustrated herein.

Referring now in more detail to the drawings, the apparatus of FIGS. 1 to 3 comprises a glass melting tank 20 having a bushing 21 disposed at the lower extremity thereof, and having a plurality of tips 22 which define openings 23 through which streams of molten glass can be flowed from the melting tank 20 to produce fibers of glass or other similar material. As is shown in FIGS. 1 and 2, a plurality of fibers 24 drawn through the openings 23 can be gathered by a shoe 25 and collected on a collet 26 which can be driven in any suitable manner either at substantially the rate that primary fibers are formed by the streams of glass flowing through the openings 23, or at any desired greater rate. When the collet 26 is rotated at a higher rate than that at which the primary fibers are produced, the primary fibers while in a molten condition, are extended axially and attenuated, so that their diameters are reduced. Although means are shown herein for forming a plurality of fibers and gathering them into a strand, it would be recognized that individual fibers as well as strands may be used in the construction of memory units.

Relatively small diameter rods 27 of electrically conductive material such as copper, or of magnetizable material, preferably with a substantially square hysteresis loop to provide the magnetizable characteristics desired, are passed downwardly through the melting tank 20 and through the openings 23 so that they are introduced into the interior of the fibers 24. As can be seen in FIG. 3, the smaller diameter rods 27 are protected against contact with molten glass in the melting tank 20 by enclosures 28 of a refractory or other material capable of withstanding the temperatures of the molten glass. Guides 29 and 30 are provided to direct each of the rods into the central portion of one of the openings 23. Each of the guides 30 extends from the bottom 31 of one of the enclosures 28 to the central portion of one of the openings 23, so that the rods 27 are introduced into the central portion of a forming cone 32 in which the glass flows into a fiber, and which cone is represented in dotted lines in FIG. 3.

As is shown in FIG. 4, a relatively small diameter rod 34 of electrically conductive material such as copper, or of magnetizable material of the type desired herein, can be introduced into the exterior of a forming cone 35 of glass or other similar fiberizable material flowing from a tip 36 of the bushing 37 disposed in the bottom of a glass melting tank 38. As is shown in FIG. 4, the rod 34 is unrolled from a suitable supply source 39, passed between feed rolls 40, and guides 41, and into the forming cone. This apparatus avoids the necessity for providing an enclosed zone in the central portion of the glass melting tank above each of the several bushing tips, and also enables the introduction of relatively low temperature rods into the glass forming cone. This feature can be advantageous when it is desired to fiberize a glass having a maximum devitrification temperature nearly as high as an operable forming temperature. A relatively cold rod 34 can be introduced into the forming cone 35 of such a glass, and used to chill the molten glass sufficiently rapidly to avoid devitrification during the fiberization process. If the rod 34 is low melting, it can be advanced slowly so that it is melted by the hot glass and ultimately appears as a coating on the exterior of the fiber, or it can be advanced more rapidly so that a part of it is incorporated in the interior of the fiber, and the rest is an exterior coating thereon. If the rod 34 melts only above the forming cone temperature, it may be fed at such a rate that it is entirely incorporated in the interior of the fiber.

A modification of the apparatus of FIG. 4 is shown in FIG. 5. A coated primary fiber 100 of glass or other suitable vitreous material is introduced into a forming cone 101 as it emerges from a tip 102 of a bushing 103 disposed in the bottom of a glass melting tank 104. A fiber drawn from the forming cone 101 is passed downwardly between guides 105, past a size applicator 106, along a gathering shoe 107, and is collected on a suitably driven collet 108. The coated primary fiber 100 is formed by flowing a stream of molten glass from a melting tank 109 through a tip 110 of a bushing 111 passing the resulting primary fiber 100 along a guide 112, and applying a coating of electrically conductive material, or magnetizable material, so the primary fiber from a tube 113 disposed at the lower extremity of a hopper 114. The coated fiber is then passed between pulling wheels 115 and guides 116, and into the forming cone 101.

The product made by the apparatus of FIG. 5, as shown in FIG. 6, may comprise an inner core of a vitreous material, a layer 118 of the coating material, tightly adhered to the inner core 117, and also to an exterior coating 119 of a vitreous material. If the coating layer 118 is an electrically conductive material, it may be used as a conductor in the apparatus to be described hereinafter. If the coating layer 118 is of a magnetizable material, the cross section of such magnetizable material as presented at an intersection of an array of such fibers in a magnetic memory would appear as a toroid or magnetic core or ring to the intersection for magnetization. In all the instances illustrated herein whenever the exterior is ceramic or other nonconducting material, it is obvious that other insulating means will not be required.

It will be appreciated that, if desired, a relatively small diameter rod could be introduced into the forming cone emerging from the bushing tip 110 of the furnace 109, or that a product of the type shown in FIG. 6 could be so introduced to produce even more complex multiple component fibrous structures. For example, if a product of the type shown in FIG. 6 were introduced into the forming cone emerging from the bushing 110, a product of the type shown in FIG. 7 would be produced. Such product would comprise the inner core 117, the coating 118 which might preferably be of an electrically conductive type, the glass layer 119, an adjacent glass layer 120, a coating layer 121 which might advantageously be of a magnetizable material, and a final exterior glass layer 122. Such fibrous material would constitute a multiple component fiber suitable for use in the invention which would provide an electrically conductive component, a magnetizable component, and insulation for such components from each other and from other elements in the electrical apparatus in which the multiple component fiber is being used.

It is desirable to have for use in this invention a multiple component filament or fiber which has ferromagnetic properties and a high resistivity as one component and further having an electrically conducting component. That is, a continuous ceramic multiple component filament or fiber which has an internal core of electrically conductive material and an exterior covering of magnetic properties while being electrically of relatively nonconductive character would improve the efficiency of construction of the apparatus apparatus of this invention. Further, such a novel fiber would be useful in other electrical apparatus, such as delay lines.

It has been found that a magnetic anisotropy can be established in glassy filaments by the attenuation of the glassy material into filaments or fibers of compositions containing metallic compounds such as iron, chromium, nickel, or cobalt oxides. The attenuation of the molten forms of such batch compositions causes a mechanical alignment of the atomic domains within the structure resulting in the characteristics desired.

As described hereinafter, this process entails the attenuation of a molten ferromagnetic material, as well as solutions or molten mixtures of ferromagnetic materials with other mixtures of oxides such as glass, into extremely fine filaments and to promote crystallization of the material in a manner such that the crystals are oriented with a predominate alignment along the length of the fiber as desired.

The process of forming and orienting the crystals involves first, the attenuation of the continuous fiber from a stream of the molten ferritic material to affect a mechanically oriented atomic distribution therein, and then a rapid chilling thereof to cause a freezing of the atomic distribution in the oriented fashion. The magnetic properties are first promoted by the mechanical attenuating forces acting on the plastic or semiplastic material, with or without the associated influence of a magnetic field, to thereby cause an aligned distribution of the atomic elements; while a freezing by rapid chilling of the material to a solid state when the atomic elements are in such aligned fashion results in their more positive incorporation in the structure in the aligned relation for magnetic properties.

Formation of crystals of the aligned atomic elements may be advanced by reheating and exertion of magnetic forces on the structure to additively align the atomic elements simultaneously with, or immediately after, thermal breeding of crystals from the atomic elements, whereupon a second freezing of the structure under a magnetic influence till the filament reaches a state of permanence in form results in a magnetic filament of relatively nonconducting character. Such a process is examined in more detail in U.S. Pat. No. 2,968,622 issued Jan. 17, 1961.

Referring to FIGS. 8 and 9, there is illustrated a melting unit 210 for heating and melting the supply of solid materials utilized in forming the molten ceramic material from which the magnetic ceramic component of the multiple component fiber of this invention is produced.

A feeder associated with the melting unit 210 supplies a flowing stream 212 of the molten material from an orifice tip 211. The stream is arranged to pass through a magnetic field provided by a DC field developed by a magnetic core unit 214 on a ceramic tube 230 concentric therewith. The tube 230 is of nonmagnetic ceramic and electrically nonconducting material which will withstand the temperature of the molten material attenuated from the tip 211 and is provided with a fluid cooled section 231 having a channel 232 to cause a chilling of the cone 212 on its passage through the tube. The stream is attenuated into the form of a filament or fiber 215 which is collected on a cylindrical tube 217 by a rotating collet winder 216.

In order to obtain the electrically conductive core or component desired in this fiber, a relatively small diameter rod 227 of electrically conductive material is passed downwardly through the melting tank and through the orifice 211 so that it is introduced into the interior of the fiber 215. As described hereinbefore with respect to FIG. 3, the small diameter rod 227 may be protected against contact with the molten mixture in the melting tank 210 by enclosure 228 of a refractory or other material capable of withstanding the temperatures of the molten batch in the melting tank 210. Guides 229 are provided to direct the rod into the central portion of the opening of the tip 211.

Attenuation and collection of the filament or fiber 215 can be accomplished at speeds ranging in the order of from 1,000 to 15,000 feet per minute, and in view of this rapid rate of attenuation, the material in the stream 212 is caused to be jerked or stretched into molecular alignment in which atomic domains are fixed in pattern relation conductive to alignment as magnetic structure.

The magnetic field provided by the field emitting unit 214, although not necessary in all instances, such as those where devitrification of the material does not occur in the filament-forming process, is in many instances of advantage even where only minute magnetic alignment of atomic elements is thereby accomplished.

Where the materials being formed into the multiple component filaments are of a character such that devitrification occurs during the filament-forming process, the magnetic unit 214 is of definite advantage in effecting preliminary alignment of the crystal base nuclei or crystals themselves formed during devitrification. Devitrification occurs predominately in the zone of the tip of the fiber-forming zone or immediately below the tip of the cone being attenuated into the filament, and for some compositions, the influence of magnetic forces in this zone is sufficient to impart the desired magnetic property directly to the nonconducting component of the filament being formed.

In those cases where substantially no devitrification occurs, subsequent treatment to cause devitrification and corresponding crystallization is effected by withdrawing the filament 215 from tube 217 and passing the filament through a heating zone such as a tubular heater. The filament 215 is reheated in this zone to a temperature where devitrification will occur as dictated the devitrification characteristic of the filament material being treated. The atomic domains can be further aligned in this zone by provision of a magnetic unit extending over a portion of the length of the filament corresponding to the length of the tube.

If the magnetic alignment of atomic domains is not required in the end use of the multiple component fiber 215, fibers can also be made with the apparatus of FIGS. 8 and 9 of molten solutions or mixtures of ferromagnetic materials with other mixtures of oxides such as glass wherein the glass forms a cementing matrix for the ferritic magnetic material.

If the filament or fiber is to be utilized in the memory or storage unit to be described hereinafter, the magnetizable material is preferably of the square hysteresis loop type so that binary information may be most easily impressed into the material and retrieved therefrom. If the multiple component filament 215 is to be utilized for other applications, for example a delay line with a long length of the filament 215 incorporated in the unit to delay the signal and/or separate simultaneously received signals, it may be desirable to align the crystals for a desired magnetic field effect. By provision of the mechanically aligned crystals as discussed hereinbefore, a stronger magnetic field results in the axial direction, ordinarily the preferred direction. In many instances where such magnetic alignment is not present, the magnetic axes of many of the microcrystals are not pointed in a direction for provision of optimum magnetic properties. Under such conditions only a small component of the magnetic potential can be used for the desired results in the randomly oriented arrangement of crystals. Where a glassy matrix exists in the fibers formed, the ferritic crystals can be aligned parallel to, or perpendicular to the fiber axis. Such alignment is accomplished by alignment of the atomic domains with proper field orientation at the fiber-forming cone, as well as in subsequent heat treating processes.

Referring to FIG. 10, there is illustrated in perspective a fiber which may be made from the apparatus of FIGS. 8 and 9 with an exterior component or covering 240 of ferromagnetic ceramic material and an interior core or component 241 of electrically conductive material such as copper. For use in a magnetic memory storage unit, the ferromagnetic ceramic component 240 of the fiber is preferably nonconductive and would result from glass acting as a cementing matrix for magnetizable material.

In reading the information out of a magnetic core of a memory array the information will be destroyed or erased, since only if it holds a binary "one" will it be switched to binary "zero," with a resulting change in flux causing the signal to appear at the sensing or output terminal. This destructive readout requires that the readout of any core be followed by rewriting if the information read is to be retained in the memory.

It has been proposed to provide a nondestructive readout method based upon considering a single ferromagnetic crystal of cubic shape in which preferred, or easy, directions of magnetization lie along the edges and hard directions of magnetization may be imagined to lie between them. If the crystal is magnetically saturated, with the remanent magnetization vector lying along the edge, and if a field is applied at right angles to it, the total magnetization vector tends to align itself with the field and so rotates away from the easy and toward the hard direction of magnetization. If the applied field is not sufficiently strong to rotate the vector past the hard direction, its removal permits the vector to snap back to its original position.

A core of rectangular hysteresis loop material can be thought of as made up of a large number of crystals, all aligned so that an easy direction of magnetization is at every point tangential to the core and the remanent flux $B_r$ is at every point in the tangential direction. If a magnetization force is applied perpendicular to $B_r$, the resultant B vector is rotated away from the tangential direction and there is a change in flux linking the sensing winding, the flux decreasing when the magnetization force is applied and increasing to its initial value again when the magnetization force is removed. Therefore, an induced voltage will appear across the sensing winding.

This proposal has not been put into large scale use heretofore since the required structure of the core has presented a severe manufacturing problem. However, with the methods discussed hereinbefore, it is possible to produce a conductor 241 having a ferromagnetic ceramic exterior 240, Fig. 10, in which exterior the ferromagnetic crystals may be aligned as desired.

The cross section of the conductor-magnetic material 241, 240 would present, in effect, a toroid or magnetic ring or core to the intersection of two current carrying conductors. The two conductors would, of course, be utilized to write or magnetize the information to be stored into the portion of the ferromagnetic ceramic exterior which was adjacent the intersection. A readout current would be applied to the conductor 241 inside the magnetic exterior 240, the current on conductor 241 applying a magnetization force at right angles to that remanent flux $B_r$. A flux change as desired would result which would induce a readout voltage across a sensing winding which may be a third conductor adjacent the magnetized portion of the magnetic exterior 240.

A magnetic core memory may include an array of cores having four conductors threaded through each core, each conductor acting as a single turn winding with respect to each core. Two of the conductors may be used to "write" or magnetize information into the core. A third conductor may be used to pulse the core to see if information is stored there. A fourth conductor may act as an output or sensing winding as described above.

It is obvious that by providing switching means for conductors in the array that a single conductor may be made to perform two functions, if the functions are never required simultaneously. A minimum of two intersecting conductors is required to write information into a core, since the writing currents are required to be coincident. However, by properly connecting switching means to the two writing conductors one of the conductors may carry the sensing pulse to the core while the other conductor may be used to pick up the induced output pulse, particularly when using the multicomponent filament having an aligned ferromagnetic ceramic exterior 240 and an electrically conductive interior 241. Both writing conductors may have magnetic exterior coverings.

It should be noted again that although the invention is being described specifically with references to ceramic or glass component fibers that the invention is intended to cover other nonconductive materials, particularly those that are capable of being formed into flexible filaments or fibers. The other nonconductors may also act as a cementing matrix cementing matrix for magnetic materials or crystals in the manner described herein.

Referring to FIG. 11, there is illustrated schematically an example of a magnetic memory unit which comprises an array of small magnetic cores 250. Information is supplied to the magnetic cores 250 by a vertical column of conductors X1, X2, X3, etc., and by a horizontal row of conductors Y1, Y2, Y3, etc. A magnetic core 250 is disposed in magnetizable relationship with each intersection of the column and row conductors. It will be noted that there is only one intersection of any two conductors. When it is desired to store binary information in one of the magnetic cores, current is supplied to each of the two conductors meeting at the intersection containing the magnetic core. Assume that it is desired to store information in the magnetic core at the intersection of conductors X1 and Y1. One-half of the current necessary of the desired polarity is supplied to conductor X1 to magnetize the magnetic core 250 in the desired direction. The remaining one-half of the current necessary of the same polarity is supplied to conductor Y1. The two currents add at the intersection of X1, Y1 to provide the flux necessary to drive the magnetic core 250 to saturation. When the signals are removed from conductors X1 and Y1, the magnetic core 250 at that intersection will remain magnetized in the desired direction. While the magnetization of the magnetic core at the intersection of conductors X1, Y1 has occurred, no lasting magnetization will result in the remainder of the magnetic cores in the array disposed adjacent conductors X1 and Y1 since each of the remaining magnetic cores receives only one-half of the current necessary to saturate the core and the magnetism will return to its previous state when the current is removed from the conductors X1 and Y1. Thus, depending upon the direction in which the magnetic core at the intersection of conductors X1 and Y1 is magnetized, a binary zero or a binary one has been stored. FIG. Retrieval of the information stored in the array shown etc. FIG. 11 is accomplished by sensing and readout means well known in the art. For example, the information may be sensed by putting a DC pulse into one of the sets of rows or columns of conductors, i.e., the "X" or "Y" conductors of the array. In order to read out, sensing wires such as those shown in FIG. 11 at S1, S2 and S3 may be placed in the array adjacent each intersection. When a pulse is placed into the conductors X1, X2, X3, etc., the coupling at the storage intersection is high. The current in conductor X1 may provide flux lines that induce current in either conductor Y1 or in sensing conductor S1.

Referring to FIG. 12, there is illustrated a two-fiber embodiment of the teachings of this invention for the storage of information. Fiber 260 is arranged to be disposed adjacent to fiber 270 at only one intersection. In one form of the invention, fiber 260 may comprise a multiple component fiber having an interior component 261 of an electrically conductive material and an exterior covering or coating component 262 of magnetic or ferromagnetic ceramic material. Fiber 270 may similarly be a multicomponent fiber having an interior conductive component 271 and an exterior coating or covering component 272. The coating 272 may be an insulating component. However, exterior component 272 may also be of magnetizable material, preferably of the type which is nonconductive. By referring to the description of the array of FIG. 11 and the foregoing material, it will be seen that currents of the proper polarity and magnitude occurring simultaneously or coincidentally on both of the electrically conductive components 261 and 271 will cause both the magnetic portions 262 and 272 adjacent to the intersection to be magnetized in the desired direction to store the information. Information may be retrieved by any of the methods discussed hereinbefore or known in the art. A sensing conductor or fiber may be disposed adjacent the magnetized portion or portions of the magnetizable material to retrieve the information stored in the manner shown in FIG. 11.

An array of as many intersections as desired may be constructed from a first plurality of electrically conductive flexible fibers and a second plurality of electrically conductive flexible fibers, the fibers being arranged in the array so that a fiber of the first plurality is disposed adjacent a fiber of the second plurality at only one intersection. In the illustration of FIG. 12, the ceramic or ferromagnetic ceramic coatings 262 and 272 insulate the electrically conductive portions of the fibers from each other.

Such an array made from fibers may be woven to provide an integral structure. If it is not desired to weave the two pluralities of fibers together, the intersections desired in an array may be obtained by simply providing parallel rows of the first plurality of fibers in a first plane, and overlaying the first plane with parallel columns of the second plurality of fibers so that there is only one intersection between a fiber in the first plurality and a fiber in the second plurality. The two planes of fibers may then be bound into an integral structure by coating the overlays with a binder, preferably flexible when cured, such as by spraying. An integral structure is again attained. Both the woven and binder held structures may be formed to any desired geometrical configuration to fit in the chassis of the computer as desired.

The high tensile strength of glass in fiber form improves the mechanical strength and durability of the memory unit. By using individual fibers, the storage capacity per unit weight or volume is tremendously increased. It should be noted that even though the fibers are woven together, the array may still receive a covering of a plastic or flexible material to provide added protection to the memory unit. Such a memory storage unit is particularly useful in microminiaturization and where the units may be subjected to substantial impact or gravitational forces.

Referring to FIG. 13, there is illustrated another embodiment of the teachings of this invention in which a first plurality of fibers 280 are disposed in substantially parallel fashion in a plane. A second plurality of fibers, represented by the fiber 290, are disposed in substantially parallel fashion in a second plane. The two planes are arranged in an array so that a fiber of the first plurality is disposed adjacent a fiber of the second plurality at only one intersection.

The magnetizable means 300 in this instance may comprise magnetic material 301 held in a matrix and supported by a surface 302, preferably of a flexible material. The magnetic means 300 is disposed in a plane substantially parallel to, and in this instance intermediate, the planes of the fibers 280 and 290. The fibers 280 may each comprise an interior core 281 of electrically conductive material and an exterior or coating 282 of glass to provide insulation in the case of accidental misalignment during assembly of the array and high tensile strength for the fiber. Similarly, fibers 290 may each comprise an interior core 291 of electrically conductive material and an exterior covering 292 of glass to provide strength and insulation.

In operation, the memory unit of FIG. 13 is adapted to magnetize the magnetic material 301 adjacent the intersection of any of the two fibers which receive simultaneously sufficient current of the same polarity to store information. Sensing and readout fibers may be included in the array of FIG. 13. A flexible binder such as shown at 310 may be sprayed on both the top and the bottom of the array to hold the fibers 280 and 290 in alignment, and to bind the fibers to the magnetic means 300. In the embodiment shown in FIG. 13, the composition of the interior core components and the coating components 281, 282 may be reversed from glass to conductive material since the magnetizable means 300 separates the first and second pluralities of fibers.

Referring to FIG. 14, there is illustrated a means for providing a connector for a multiple component fiber of this invention. Fiber 320 may have an interior core component of conductive material 321 and an exterior ceramic component or ferromagnetic ceramic component 322. In addition to the other desirable characteristics provided the multiple component fibers of this invention by glass, an additional desirable property is that whenever the fiber is broken it shears cleanly at the broken end providing a substantially uniform exposure of the electrically conductive portion as well as the ceramic portion. The broken end may be dipped in a flux or kept in an atmosphere to keep the electrically conductive material from oxidizing, e.g., silver, copper, platinum, etc. The fiber then is dipped into a molten conductive material, preferably of the same composition as the core, which adheres to the electrically conductive portion 321 and overlays the exterior ceramic portion 322. After removal from the dip, the adherred conductive material 323 cools and hardens to provide a solid connector. The connector 323 is applicable to the fiber 320 whether the conductive portion of the multiple component fiber is the interior core or the exterior coating. Further, the method and connector of FIG. 14 may be applied to a strand comprised of a plurality of fibers 320 to provide a common connector for all of the conductive portions of all of the fibers.

Referring to FIG. 15, there is illustrated in cross section an intersection of three fibers of a memory storage unit further embodying the teachings of this invention. A first fiber 330 having an electrically conductive interior core 331 and an insulating exterior component 332 is arranged to have one intersection with a second fiber 340, also having an electrically conductive core 341 and an insulating exterior 342. Disposed adjacent the intersection of fibers 330 and 340 is a sensing and storing fiber 350 which may have an electrically conductive interior component 351 and a magnetizable coating or exterior exterior 352, which may be any of the magnetizable materials or ferromagnetic ceramic magnetizable materials described hereinbefore.

In operation, the memory storage unit of FIG. 15 would be operative to store in the magnetizable coating 352 of fiber 350 information upon simultaneous receipt of signals on electrically conductive portions 331 and 341 of fibers 330 and 340. The information stored in the magnetized portion of the exterior coating 352 of fiber 350 may be read out on the electrically conductive core 351 upon the receipt of a sensing pulse placed on either electrically conductive core 331 or 341 of the fibers 330 and 340. It is obvious that an interchange of the composition of the various cores and coatings may be accomplished to provide varying results of storage and readout.

The structure of the embodiment illustrated in FIG. 15 may be utilized to obtain a "nondestructive" readout in accordance with the discussion hereinbefore. That is, the exterior coating 352 of the fiber 350 may have the magnetic crystals aligned. A sensing pulse of the proper magnitude and polarity may be applied to the electrically conductive portion 351 which will induce a readout voltage in a conductor being used in the output mode, without destroying the information stored.

The two fibers 340 and 350 may be replaced by a single multiple component fiber such as that illustrated in FIG. 7 which would include a sensing layer, a magnetic layer, and a "read-in" conductive component or layer. All layers may be separated by intermediate layers of insulating material, preferably ceramic, or the two conductive portions may be separated by the ferromagnetic ceramic composition described hereinbefore. In the latter instance, it may be desirable to add an insulating or ceramic covering to the exterior of the three layers.

Although the embodiments disclosed in FIGS. 12, 13 and 25 have been discussed in terms of individual fibers, it is apparent that if increased current carrying capacity and/or magnetic storage capability is desired, or if additional strength is desired for purposes of weaving or because of the forces that may be applied to the unit later will great, the multiple component fibers may be replaced by strands, each having a plurality of multiple component fibers therein. The memory unit may then comprise a first plurality of electrically conductive flexible fibers formed into a first strand, a second plurality of electrically conductive flexible fibers formed into a second strand, the first and second strands being arranged to be disposed adjacent to each other at only one intersection. As is shown in the instance of the individual fibers, the magnetizable means is disposed in magnetizable relationship with the intersection of the strands. The fibers of each strand may be multiple component fibers having an electrically conductive interior component and further including the insulating means as an exterior component covering the interior conductive component. Each of one of the plurality or both of the plurality of multiple component fibers may further include the magnetizable means as a component thereof as a coating. Connectors as described with respect to FIG. 14 may be provided for the end of the strands. The embodiment of the memory unit utilizing strands may be constructed in the manner illustrated in the embodiment of FIG. 15. The magnetizable means may comprise a third plurality of flexible fibers of the type as shown at 350. The third plurality of magnetizable flexible fibers may be joined with a similar plurality of fibers such as shown at 340 to form a single strand for greater ease in weaving the strands into a desired array.

The invention thus discloses novel and useful memory or storage units for use with electrical signals. The invention further discloses a novel continuous flexible fiber suitable for use in electrical apparatus such as the memory unit or a delay line, which comprises at least an interior core and an exterior covering. One of the components of the multiple component fiber may be an electrically conductive material while another component may be a ferromagnetic ceramic material which is electrically nonconductive. The ferrite crystals may be aligned to provide a desired result. The novel fiber of this invention may further include the novel connector as described in FIG. 14. A plurality of the novel multiple component flexible fibers may be combined to form a strand suitable for use in electrical apparatus. The novel strand may also be provided with the novel solid connector as described with respect to FIG. 14.

In conclusion, it should be noted that variations to the methods and apparatus taught in this invention may be made to attain the desired product and result. However, the embodiments disclosed and described herein are meant to be illustrative only and not limiting in any sense. The embodiments described serve merely to illustrate the spirit and scope of the invention.

I claim:

1. A memory unit comprising a first electrically conductive flexible glass fiber and a second electrically conductive flexible glass fiber arranged to be disposed adjacent each other at only one intersection, each glass fiber being a multiple component fiber with a continuous interior core component and a continuous exterior component covering said interior component, one of said components being electrically conductive and the other of said components being glass, at least one of said exterior components of said first and second fibers being glass to prevent direct electrical conduction between said two fibers, at least one of said multiple component fibers having a third continuous component of magnetizable material providing magnetizable means disposed in magnetizable relationship with said intersection of said fibers.

2. A memory unit as defined in claim 1 in which said magnetizable component of said one multiple component fiber includes a layer of ferritic crystals aligned in a predetermined orientation.

3. A memory unit as defined in claim 1 in which there are a first plurality of said first electrically conductive flexible fibers and a second plurality of said second electrically conductive flexible fibers, said fibers being arranged in and array so that a fiber of said first plurality is disposed adjacent a fiber of said second plurality at only one intersection.

4. A memory unit as defined in claim 1 in which a connector is provided for the fibers by applying molten conductive material to the sheared ends of said fibers, said molten conductive material joining to said conductive components electrically and cooling to provide a solid connector.

5. A memory unit comprising a first electrically conductive flexible glass fiber and a second electrically conductive flexible glass fiber, said first and second fibers being adjacent each other at only one intersection, and a third fiber means of flexible magnetic glass arranged to have a portion adjacent said intersection of said electrically conductive fibers, each of said first and second fibers being multiple component fibers with a continuous interior core component and a continuous exterior component covering said interior component, at least one of said exterior components of said first and second fibers being glass to prevent direct electrical conduction between said two fibers.

6. A memory unit as defined in claim 5 in which there are a first plurality of said first fibers and a second plurality of said second fibers, said fibers being arranged in an array so that a fiber of said first plurality is disposed adjacent a fiber of said second plurality at only one intersection, and in which said magnetic fiber means is arranged to have a portion of said fiber means disposed in magnetizable relationship adjacent each intersection of said plurality of electrically conductive fibers.